Figure 1:
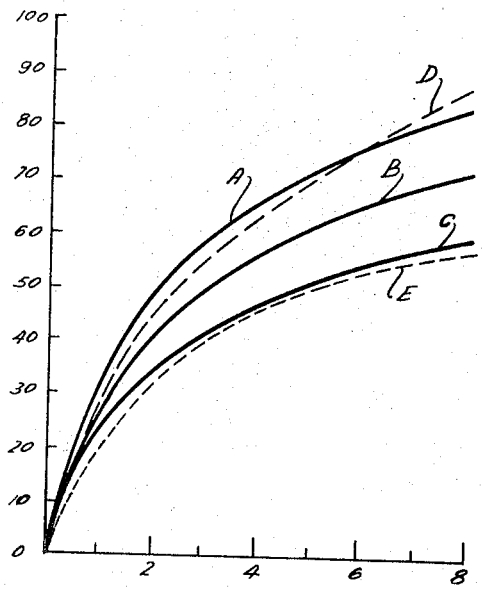

May 2, 1967   LARS-EINAR FRYKLOF ET AL   3,317,394
MEDICINAL TABLET AND A METHOD FOR ITS PREPARATION
Filed Dec. 14, 1956   3 Sheets-Sheet 3

INVENTORS.
LARS-EINAR FRYKLÖF
ERIK SANDELL
BY JOHN IVAN GEORG ÖSTHOLM

A. A. Orlinger
ATTORNEY

United States Patent Office 3,317,394
Patented May 2, 1967

3,317,394
MEDICINAL TABLET AND A METHOD FOR ITS PREPARATION
Lars-Einar Fryklof, Enskede, Erik Sandell, Djursholm, and John Ivan Georg Ostholm, Molnlycke, Sweden, assignors to Aktiebolaget Hassle, Apotekare Paul Nordstroms Fabriker, Goteborg, Sweden, a Swedish company
Filed Dec. 14, 1956, Ser. No. 628,408
Claims priority, application Sweden, Dec. 22, 1955, 11,605/55
35 Claims. (Cl. 167—82)

This invention is that of the manufacture of tablets containing solid material soluble in a liquid medium to which the tablets are to be exposed, and which soluble material is uniformly distributed and compacted in pore-like inter-connected canals and ducts of a firm skeleton structure formed of particles of a material insoluble in that medium and intermingled and compacted and compatible with and about the particles comprising the soluble material, and from which tablets the latter is releasable by dissolution at a pre-determined pattern of rate of release. The invention includes also the tablets of the foregoing structure, content and character as to pattern of rate of release of its soluble material on exposure to a solvent liquid medium.

The invention in its broader sense embraces such tablets applicable in any field in which their advantageous characteristics can be beneficially employed. However, their presently most interesting application is in their provision of medicinal or pharmaceutical tablets having a pre-designed or pre-determined pattern as to rate of release of their medicament or therapeutic content. Thus, for example, the invention includes the method of manufacturing, as well as the pharmaceutical or medicinal tablets having a delayed or prolonged, and sustained or enduring therapeutic action, after administration. In such a tablet the medicament is not released from the tablet rapidly after it has been administered, but rather that the tablet shall not commence to release its medicament until a certain time has passed after the administration, or the tablet shall release its medicament at a low rate only, or both said requirements shall be manifested by the tablets.

It is one feature of the invention to provide medicinal tablets which under the action of the gastric juices or other body fluids, release their medicament content at a substantially even rate or speed, i.e. the amount of medicament which is released per unit time shall be substantially constant.

It is another feature of the invention also to provide such medicinal tablets which, after having been administered, initially release part of their content of medicament rapidly, and then release the medicament residuum at a lower and constant speed.

It is a further feature of the invention to provide such medicinal tablets which release their content of medicament at a rate which is substantially independent of the pH-value of the fluids that the tablets contact.

It is a still further feature of the invention to provide medicinal tablets in which the speed of release of the medicament is pre-designed and pre-determined with considerable accuracy, and in which also the time lag from after the administration to before the tablet commences to release its content of medicament likewise may be pre-determined with great accuracy. It is a special advantage of the invention in providing medicinal tablets in which these two said factors are pre-determined with great accuracy even in the case of tablets that contain only small amounts of medicament.

The description of the invention can be amplified in relation to the accompanying drawings, the particular nature of which is explained respectively hereinafter.

Attempts have been made heretofore to reduce the rate of dissolution of a water-soluble substance that was to be an ingredient of tablets or granules, by making such tablets or granules hydrophobic to a certain extent, for example, by an admixture of calcium stearate. In that way, it was possible to produce different granules with varying rates of dissolution in water, and which granules subsequently were mixed together and packed into capsules. By suitable proportioning of the admixed quantities, preparations with a specific type of rate of dissolution thus have been made.

A certain type of postponed or delayed action has been provided also, by covering tablets or granules with a protective coating which would dissolve slowly under the action of the digestive juices. Thereafter the tablet would disintegrate and release its medicament. Such coating material has consisted, for example, of keratin, formalin-treated gelatin, collodion, salol, shellac, higher alcohols, or cellulose acetate phthalate.

Tablets or granulations made by these earlier methods, however, have a tendency to show an uneven and unreliable absorption due to the fact, among other causes, that their rate of dissolution depends a great deal upon the state and condition of the digestive juices, for example, their pH-value. In addition, it is not always easy to obtain a sufficiently uniform product. Consequently, it has not been possible with them to pre-determine postponed or delayed absorption, with sufficient dependability.

According to the invention, a tablet having a delayed or prolonged, and sustained or enduring action is prepared by mixing a powder of a material which is substantially insoluble in the fluids that the tablet contacts, with a powder of a material which contains the medicinal substance and is soluble in those fluids, and then compressing the resulting powder mixture to form tablets; the properties and the amount of the insoluble material are so chosen that, upon compressing that powder mixture, the insoluble material forms a firmly coherent, skeleton structure, the interstices of which form pore-like inter-connecting continuous ducts and canals in which the soluble material is compactly contained.

The ratio of the soluble to the insoluble material must be such that the insoluble material forms a united but porous or spongs-like structure in which the pores have the form of continuous or inter-connecting ducts or tubular canals serving as the holders or repositories for the soluble material.

The action of the fluids that the tablet contacts will cause the soluble material gradually to be released from these ducts or canals at a rate which, only to a slight degree, is influenced by the pH-value of those fluids. When all the soluble material has been released by dissolution from such tablet, only the porous skeleton of the insoluble material remains. This skeleton either remains substantially intact or gradually disintegrates, depending, among other conditions, e.g. on the degree of compression that was applied during the manufacture of the tablets. It is conditional, however, that the skeleton structure must remain intact until all the soluble material has been substantially released or dissolved from within it.

There must be in the tablets a definite minimum quantity of the soluble material, because otherwise the particles of the soluble material might be almost entirely surrounded by the insoluble material, the dissolution of the soluble material being curtailed or prevented. If tablets containing an exceedingly small quantity of soluble material, for instance a medicament, are to be prepared, such as for example, a milligram or centigram dosage of the material, this latter should be mixed with a water-soluble filler substance in powder form and in such a quantity that the total volume of soluble material reaches the required minimum quantity. When preparing medicinal tablets this filler substance can consist of a therapeutically inactive or physiologically inert substance, such as sodium acetate, sodium chloride or lactose, but may even consist of some other desired and compatible substance.

The active material used need not necessarily be in powdered solid form. A liquid substance for instance a medicine, also can be incorporated in a tablet by mixing the liquid substance with a sufficient quantity of such powdered filler substance to take up the liquid and leave the resulting liquid-carrying filler as discrete particles that generally readily can mix with the insoluble material to form a mix suitable for tabletting; and then mixing the resultant liquid-carrying filler with an insoluble material in the manner already described, and making the tablets from this resulting mixture.

If the dosage of a material is to be very small, alternatively it can be dissolved initially in a compatible solvent before being mixed with such filler substance. Nitroglycerin, for instance, thus can be dissolved in alcohol, and the resulting solution mixed with common salt as a filler in sufficient quantity as just above described, and these solution-carrying salt particles are then mixed with a powder of an insoluble material, and the resulting powder mixture is formed into tablets by compression.

As previously indicated, the relative ratio of the soluble to the insoluble material in the tablets is of vital importance in relation to the rate of dissolution. For example, FIG. 1 shows this rate of dissolution in the case of three tablets, all containing 25% of amobarbital as the soluble medicament, varying quantities of polyvinyl chloride as the insoluble material, and the remainder sodium acetate as soluble inert filler. The tablet depicted by its graph A contains 22.5% of polyvinyl chloride, that of graph B contains 30%, and the one of graph C contains 40% of it. As is observed, in the case of the tablet containing 22.5 percent of polyvinyl chloride, 85% of the initial total quantity of the amobarbital was dissolved after a period of 8 hours, whereas in the case of the tablet with 40 percent of polyvinyl chloride, only 60% of the initial amobarbital was dissolved.

It can be stated generally that the smallest quantity of insoluble material to be used is governed by the quantity required to form a firm and integral but yet porous skeleton structure to hold the soluble material.

FIG. 1 shows that it is possible according to the invention to prepare a tablet containing only 22.5% of the insoluble material. Such a tablet, however, usually has inadequate strength for practical purposes. Therefore, we prefer, and it is practical, to prepare tablets containing from about 40 to about 95% of the insoluble material. If the soluble material has a comparatively low rate of dissolution, a percentage of from about 40 to about 50 of the insoluble material can be appropriate, whereas in case the soluble material happens to be very easily dissolved, a percentage of the insoluble material of from about 80 to about 95 can be suitable.

We have found it suitable to mix the soluble and insoluble materials in weight ratios of about one part of the soluble one to from about one to about five parts of the other. The most practical content of insoluble material may be determined readily in each case by a simple routine test. Thus, the insoluble material is mixed with the soluble substance in different ratios, e.g. 40 to 60, 50 to 50, 60 to 40, 70 to 30, 80 to 20, 90 to 10 and 95 to 5; these various mixtures then are compressed into tablets, and the mechanical strength and the course of releasing of the soluble substance is determined for each such test tablet. The test sample giving the desired behavior as to strength, firmness of structure and release of soluble content indicates the proportion of soluble to insoluble ingredients to use in the operating batch.

If the quantity of the insoluble material to be used in the tablets is to be relatively small, generally a comparatively high pressure is necessary when the mixture is being moulded into tablets, in order to cause the insoluble material to form a framework skeleton structure of sufficient strength. If it should be desirable to increase the strength of the porous skeleton structure even more, it is possible, when using a thermoplastic or thermosetting material as the insoluble material, to subject the moulded tablet to careful heating, provided, of course, that the medicament or any other soluble material constituting part of the tablet, will not be damaged from such treatment. The heating will bring about a mild sintering or fusing of the insoluble granules, with consequent increase in the strength of the porous skeleton structure. It should be borne in mind that in the case of tablets to be administered by mouth (i.e. per os), it may be of advantage to have the porous structure of such strength that it will disintegrate under the action of the intestines, after the soluble material has been dissolved out.

No general rule can be given with respect to the pressure necessary for compressing a pulverulent mixture to form a tablet according to the invention. For a tablet of a predetermined composition, the compressing load shall be so high that the porous skeleton structure of insoluble material remains intact during the releasing of the medicinal substance. When preparing our tablets, the strength of the finished tablet is usually measured by means of the Strong-Cobb Hardness Tester.

When preparing medicinal tablets, we have found it suitable to prepare tablets having a strength of from about 6 to about 15 kilograms. However, a strength of from about 10 to about 12 kilograms, measured by the Strong-Cobb Hardness Tester, is preferred generally. The specific range of pressures to employ in the compression of the final tablets cannot be given as applicable to all the various possible compositions and tablets having retarding layers and/or overall coatings.

For any such individual composition and type of tablet, the preferred pressure to use to provide an adequately firmly coherent skeleton structure from the originally powdered insoluble material, can be found by simple routine test. Thus, tabletting mixes for the desired type of tablet to be made of any particular composition are prepared; and several tablets then are prepared from it under a first pressure and tested either by pressure testing machine (e.g. The Strong-Cobb Hardness Tester) and/or by submersion, for example, in slightly acid water to see whether after elution therein of the soluble material of the tablet, the skeleton structure will crumble or not. If the skelton crumbles, additional tablets are prepared at a higher pressure and similarly tested. Thus, in a few such tests of tablets prepared at different pressures, there can be determined readily the optimum operating pressure to use for the particular composition and desired type of tablet.

Aside from the relation between the soluble and insoluble materials, and obviously also the rate of dissolution of the soluble material from the product, the size of the granules of the soluble material plays an important part in controlling the speed at which the soluble material will be released from the tablet. For medicinal tablets, the size of the particles of the granular soluble material should be comparatively uniform, and generally held at from about one-tenth to about one millimeter across.

The size of the particles of the insoluble material does not appear to be particularly important in relation to the rate of dissolution of the soluble material. It is preferable for the size of the particles of grains of the insoluble material to be from about one-tenth to about one millimeter, for thereby it is possible to obtain a satisfactory flow in the tabletting machines, as well as high accuracy of dosage. They may be, of course, somewhat smaller or even somewhat larger.

A grain size within the specific range just mentioned makes it possible to prepare tablets in which the insoluble material forms a skeleton structure having sufficient strength, and from which the soluble material is released by dissolution at a rate that is convenient for medication purposes.

The rate of dissolution of the soluble material depends on the outer shape of the tablet. Thus, a tablet having a large specific surface, i.e. a flattened tablet, releases its content of soluble material more rapidly than does a tablet having a small specific surface, e.g. a spherical tablet.

It is often advantageous to agglomerat the powdered soluble material (e.g. by the common granulation methods of pharmaceutical production) to form larger grains, whether the soluble material consists of a single material or of a mixture of several substances, for example, a mixture of a medicament and a physiologically inactive or inert substance. Such enlargement of the grains of the soluble substance results in the finished tablet's having more well-defined ducts or canals containing the soluble material, and enables pre-determining more satisfactorily its rate of dissolution.

When using a soluble material comprising a plurality of soluble substances having respectively different rates of dissolution, it is advantageous if the particles of these substances of different rates of solubility are granulated together into larger granules. Otherwise it may happen that the particles of some not so readily soluble portion of the soluble material will be retained in the porous skeleton structure of the insoluble material. Thus, when such more readily dissolved material has been dissolved from the tablet, the latter still would contain considerable quantities of such not so readily soluble portion of the soluble material. Such agglomeration of these particles facilitates the dissolution of both readily and the not so readily dissolved substances from the tablet at substantially the same relative rate, thereby resulting in the composition of the soluble material in the tablet remaining constant throughout its dissolution.

In FIGURES 1 through 4, 8, 9 and 11, the numbers along the horizontal represent time in hours, and the numbers along the vertical represent quantities dissolved.

Tablets represented by graphs A, B and C of FIG. 1, were dissolved in a liquid medium having a pH-value of 1. FIG. 1 also shows two further graphs D and E, representing tablets that were dissolved in a liquid medium having a pH-value of 7.5. The tablets covered by graph D have the same composition as those represented by graph A; and the tablets of graph E have a similar composition to that of the tablets of graph C. These graphs illustrate that the rate of dissolution varies insignificantly with respect to the pH-value.

Figure 2:
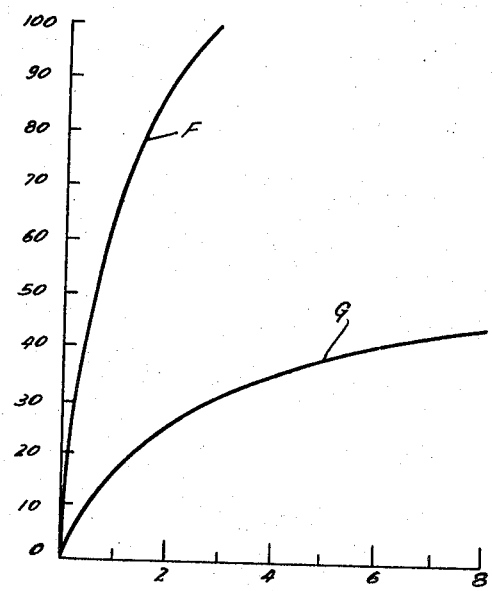

The possibility of producing tablets according to the invention, in which the rate of dissolution of the soluble material is not influenced greatly by the pH-value of the solvent medium, is illustrated also in FIG. 2. Its graph G shows the quantity of dissolved material as a function of time for a tablet containing 25% hexobarbital (i.e. hexobarbitone), while graph F shows the same for a tablet containing an equivalent quantity of hexobarbitone sodium. The insoluble material is polyvinyl chloride, to the extent of 30% in both of these tablets. These two tablets also contain sodium acetate as the balance up to 100%. The laboratory experiments represented by graphs F and G were carried out using as the solvent medium "artificial gastric juice" having a pH-value of approximately 1.

The slowly dissolving hexobarbitone, as expected, dissolved only gradually, with the result that after a lapse of 8 hours, only 45% of the initial total quantity of hexobarbitone had been dissolved from the tablet. Despite the highly acidic environment, the hexobarbitone sodium dissolved considerably more quickly, and was completely released from the tablet in less than 3 hours. That corresponds approximately to its rate of dissolution in water (with neutral reaction).

Since hexobarbitone sodium in an acidic medium yields the more slowly dissolving hexobarbitone, it would be expected at first that the initially dissolved hexobarbitone sodium while still in the porous skeleton structure, would be converted in the acidic gastric juices into hexobarbitone and this latter then would be dissolved at the slower rate indicated in graph G. That that did not occur, but instead the hexobarbitone sodium was dissolved at the rate roughly corresponding to its rate of dissolution in a liquid at a pH-value of 7, may be due to the neutralising effect exerted by the hexobarbitone sodium in the pores of the tablet. This effect probably is enhanced by the buffer action of the sodium acetate.

In medicinal tablets to be administered per os, it is often desired, as has been mentioned above, that release of the medicament be delayed for some specific time after administration. According to the invention, this is obtained by preparing a core containing the medicament, and covering that core with a mixture of water soluble and insoluble materials, compressed so that the insoluble material forms a coherent porous skeleton structure wherein the soluble material is contained in the pore-like ducts and canals of said structure. The soluble material for inclusion in the coating can contain a quantity of a medicament substance; or alternatively it can consist of a therapeutically inert filler substance.

The core may be an ordinary tablet or, according to the invention, the core may consist of a mixture of soluble and insoluble substances compressed together. The core need not necessarily form a compact body. It is possible with the use of the tablet moulding machine to have a loose powder as a core, and to surround it with a loose powder from which to form the coating, and then in a single operation to compress both core and coating into a tablet.

The extent of retardation of the dissolution of the soluble content of the core is determined by the thickness of the coating, the amount of soluble material in the coating, and the rate of solubility of that soluble material. For pre-determining the extent of retardation with great accuracy, it is necessary that the coating have overall uniform thickness. When all the soluble material in the coating has been removed by dissolution, the soluble material contained in the core will begin to be released. In case the soluble material of the core dissolves rapidly and while the coating is still intact, the soluble material then will penetrate the porous coating at a substantially constant rate.

If there is desired a very rapid dissolution of the contents of the core after the soluble material of the coating has been dissolved, it is possible in the preparation of the core to admix in it a dry powder of a substance which swells in water. Then when the moisture of the fluid that the tablet contacts penetrates the core, that substance is caused to swell and ruptures the coating, whereupon the core soon dissolves.

If, on the other hand, it is desired for the core to have a very slow dissolving action, then the core can be made in the same manner as the coating, that is to say, by pressing together a mixture of soluble and insoluble materials.

A composite tablet of the kind thus described makes it possible to prepare a medicinal tablet that gives first a high initial dose and thereafter releases the residuum of the medicament at a substantially constant rate of release. This is accomplished by incorporating in the coating of medicament of the same kind as is included in the core. Of course, the coating may contain a medicament different from that of the core, or a physiologically inactive or inert substance, for example, potassium sulphate, sodium chloride, or lactose.

There exist, therefore, a good many possibilities for fixing the speed and time for the dissolution of a medicament contained in a tablet, simply by varying the composition of the core and/or of the coating of such tablet in the manner indicated above.

A couple of examples of a laboratory investigation of the rate of dissolution in water having a temperature of 37° C., of composite tablets of the type described above are illustrated in FIG. 3. In it graphs H and I represent tablets each of which has a core consisting of a moulded tablet of 125 milligrams of hexabarbitone sodium, surrounded by a coating made by compressing a mixture of 75 milligrams of polyvinyl chloride and 125 milligrams of soluble material. In the tablet represented by graph H this soluble material in the coating consists of potassium sulphate, whereas in the coating of the tablet of graph I it is hexobarbitone sodium, i.e. the same substances as is its core. Size of grain and other conditions observed in the process of manufacture of these tablets are otherwise the same in both cases.

The potassium sulphate in the coating of the tablet of graph H is dissolved out in about two hours. The hexobarbitone sodium of its core then starts to dissolve at a substantially constant rate, and its dissolution is complete after a total period of three and a quarter hours.

In the case of the tablet of graph I, the dissolution of the hexaborbitone sodium in the coating commences immediately, at first quite rapidly, and then becomes slower and slower. After approximately an hour and a quarter, when 40% of the total quantity of hexobarbitone sodium initially in the tablet, i.e. 80% of the quantity of hexobarbitone sodium in the coating, has been dissolved, dissolution of the hexobarbitone sodium in the core commences at a substantially constant rate, because moisture has penetrated into the core. Complete disolution is accomplished in a total period of two hours.

With the tablet represented by graph H, it is shown that dissolution of the medicament does not occur until after about two hours. With the tablet represented by graph I the result was obtained that dissolution of a portion of the medicament substance is spread over a period of approximately an hour and a quarter and also that the remaining portion of the medicament does not start to dissolve until after that about an hour and a quarter.

It is of interest to note the manner in which the delayed action depends upon the solubility of the soluble substance contained in the coating. The substantially straight-lined portion of each of graphs H and I has been displaced in the time dimension approximately an hour and quarter due to the fact that the hexobarbitone sodium in the coating of the tablet represented by graph I is more rapidly dissolved than the potassium sulphate in the coating of the tablet of graph H.

Figure 4:
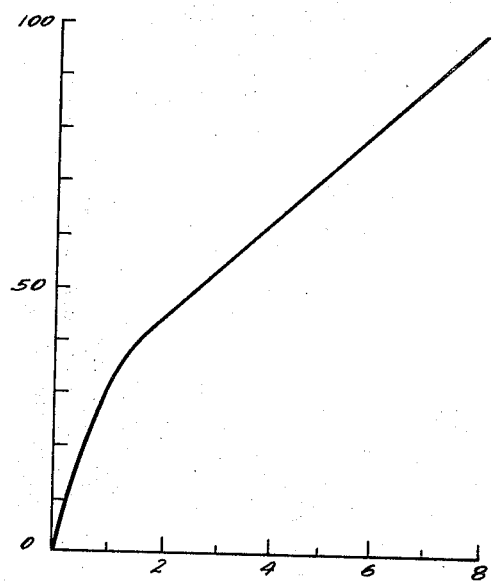

FIG. 4 illustrates the course of dissolution of the medicament in a tablet prepared in the following way: 14 milligrams of ephedrine hydrochloride having a grain size of about 100 microns was mixed with 74 milligrams of sodium chloride and 110 milligrams of polyvinyl chloride, the two latter substances having a grain size of about 500 microns. The mixture was compressed to form a tablet having a diameter of 8 millimeters and a height of 2.7 millimeters. That tablet was placed as a core in a die of a tablet machine, and was covered on all sides with a powder mixture containing 9 milligrams of ephedrine hydrochloride, 36 milligrams of sodium chloride and 180 milligrams of polyvinyl chloride, all substances having the same grain size as the respective substances of the core. The aggregate was compressed to form a composite tablet, having a diameter of 10 millimeters and height of 4.7 millimeters. After about 1 hour of leaching in water, the soluble material in the coating had been dissolved, and the medicament contained in the core then began to penetrate the coating at such a constant rate that all of the medicament was released from the tablet after the lapse of about 8 hours.

In a tablet consisting of an insoluble skeleton structure containing a soluble material, the dissolution of the soluble material may be illustrated by means of an exponential curve, because the rate of its dissolution is greatest when the dissolution begins, and then becomes slower and slower. Such a typical curve is illustrated in FIGS. 1 and 2.

The present invention, however, makes it possible to prepare medicinal tablets having a prolonged action with the curve of dissolution of the soluble material being substantially rectilinear. That means that the amount of medicament released per time unit is substantially constant during the whole period of dissolution, or during the significant part of said period.

Figure 3:
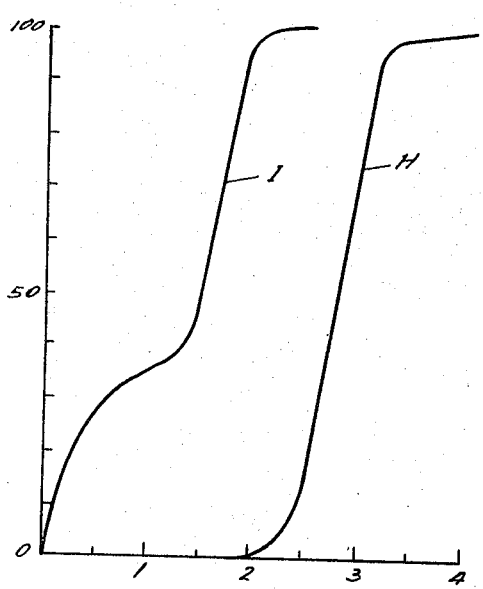

One method of preparing tablets, the dissolution rate of the soluble material of which manifests such a rectilinear curve, has been referred to in connection with the composite tablets, the curves of dissolution of which are illustrated in FIGS. 3 and 4. The curves of these figures contain a rectilinear portion, which means that over the period represented by that portion the medicinal agent is released at a constant rate.

Figure 5:
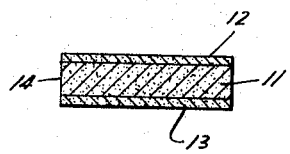

Another way of preparing tablets, the dissolution rate of whose soluble material gives such a rectilinear curve is in the form of so-called multi-layer tablets, the manufacture of which will be described with reference to FIGS. 5 through 11. FIG. 5 shows a vertical diametric cross-sectional view of a cylindrical tablet consisting of a core 11, with its two flat opposite sides, sandwiched between the two retarding layers 12 and 13. The core 11 was prepared by compressing a mixture of 19 milligrams of ephedrine hydrochloride having a grain size of about 100 microns, 11 milligrams of sodium chloride and 70 milligrams of polyvinyl chloride, the two latter substances having a grain size of about 500 microns. Each of the retarding layers 12 and 13, provided upon core 11, weighs 50 milligrams and consists of a mixture of 20% of sodium chloride and 80% of polyvinyl chloride, both substances having a grain size of about 500 microns. The diameter of core 11 is 8 millimeters, and the total height of core 11 and layers 12 and 13 is 3.1 millimeters.

Under the action of the digestive juices, the ephedrine hydrochloride will commence to be released by dissolution from the exposed annular surface 14 of core 11. The amount of ephedrine hydrochloride released per time unit can be illustrated by means of an exponential curve. Simultaneously, the sodium chloride in layers 12 and 13 will be dissolved and released. When all sodium chloride has thus been released and removed from layers 12 and 13, ephedrine hydrochloride will also be released from their respectively adjacent opposite, plane surfaces of core 11. Thus, ephedrine hydrochloride now will be released from a greater surface, and therefore the rate of releasing by dissolution will now increase.

Figure 8:
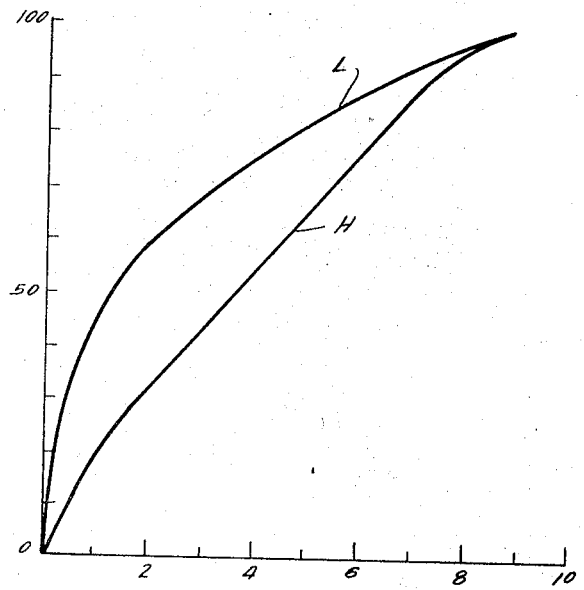

The course of dissolution of medicament from this tablet shown in FIG. 5 is illustrated in FIG. 8, by graph K which shows the total amount of ephedrine hydrochloride dissolved as a function of time. Under a period of about 1.5 hours ephedrine hydrochloride is dissolved and released only from the free annular surface 14 of the core. Then the releasing begins from the plane surfaces of core 11, that are uncovered by the complete dissolution of the soluble material from layers 12 and 13. After about 9 hours, the whole amount of ephedrine hydrochloride is dissolved and released from the tablet.

As a comparison, FIG. 8 contains a curve L illustrating the course of dissolution of the soluble material from a tablet which has no retarding layers and consists merely of a compressed mixture of ephedrine hydrochloride, sodium chloride and polyvinyl chloride.

Curve K of FIG. 8 thus is composed of two exponential curves. For most practical purposes that curve may be considered as being a straight line. The curve of dissolution of the medicament can be brought into still closer conformity with a stragiht line by considering the tablet illustrated in FIG. 6 in vertical, diametric cross-section, and in which two opposite flat sides of a cylindrical core 15 have been coated with retarding layers 16 and 17 having the same chemical composition and physical properties but different thicknesses respectively. Under the action of digestive juices, release of the medicament from the core 15 begins at the annular free surface 18, then also from the surface 28 after it is exposed following complete dissolution of the soluble material from its coating of the thinner retarding layer 16, and finally also from the plane surface 29 after its exposure following the dissolution of the soluble material from its coating of the thicker retarding layer 17. The curve which illustrates the release of the medicament from core 15 of the tablet of FIG. 6 will be composed of three exponential curves and will thus approach a straight line with good approximation.

The same result will, of course, be obtained if the retarding layers 16 and 17 are made with equal thickness but containing respectively different amounts of soluble material. The lower the content of the soluble material in a retarding layer, the lower is the rate of dissolution of that soluble material from the retarding layer. The two retarding layers may also have the same thickness but contain different soluble materials having different rates of solution respectively.

When administering a medicinal substance it is often desired to obtain rapidly an effective concentration of it in the blood, and then to maintain that effective concentration during the period intended for the medicinal substance to work. This necessitates that the medicinal tablet shall release immediately a sufficiently high initial concentration of the medicament and thereafter shall release an amount of medicament which is substantially constant per unit of time and corresponds to the amount of the medicament which leaves the bloodstream, e.g. by being decomposed or otherwise removed from it. According to the invention this may be obtained in several different ways.

One method of obtaining such a result has been described above in connection with FIG. 4 which illustrates the release of a medicament from a core covered with an overall coating prepared by compressing a mixture of the medicament, sodium chloride and polyvinyl chloride. The medicament of the coating is released comparatively rapidly and gives a high initial dose and then the medicament of the core is released at a substantially constant rate.

When manufacturing multi-layer tablets, it is possible to obtain such a high initial concentration in different ways, two of which will be described with reference to FIGS. 7, 9, 10, and 11.

Figure 6:
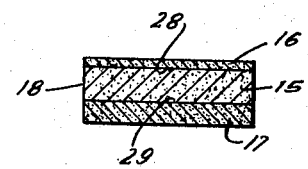
Figure 7:
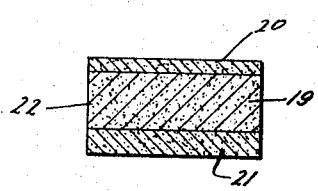

The tablet illustrated in vertical, diametric cross-section in FIG. 7 is principally of the same kind as the tablet described in connection with FIG. 6, but in that of FIG. 7 its core 19 has a greater annular free surface 22, from which the medicament initially is released. This gives a high initial concentration. Simultaneously the soluble material in its retarding layers 20 and 21 begins to dissolve into the digestive juices, and when all soluble material of layers 20 and 21 has been dissolved, the medicament contained in core 19 begins to be released also through the layers 20 and 21. After the initial dose has been released, the release of the medicament will proceed at a substantially constant rate.

Core 19 of the tablet illustrated in FIG. 7 has been prepared by compressing a mixture of 23 milligrams of ephedrine hydrochloride having a grain size of about 100 microns, 57 milligrams of sodium chloride having a grain size of about 500 microns, and 120 milligrams of polyvinyl chloride having a grain size of about 500 microns. The core has a diameter of 8 millimeters and a height of 2.7 millimeters. The retarding layers 20 and 21 are applied on the core by compressing in a tablet machine a pulverulent mixture consisting of 20% of sodium chloride and 80% of polyvinyl chloride. Layer 20 weighs 50 milligrams and has a thickness of 0.6 millimeter, whereas layer 21 weighs 75 milligrams and has thickness of 0.9 millimeter.

Figure 9:
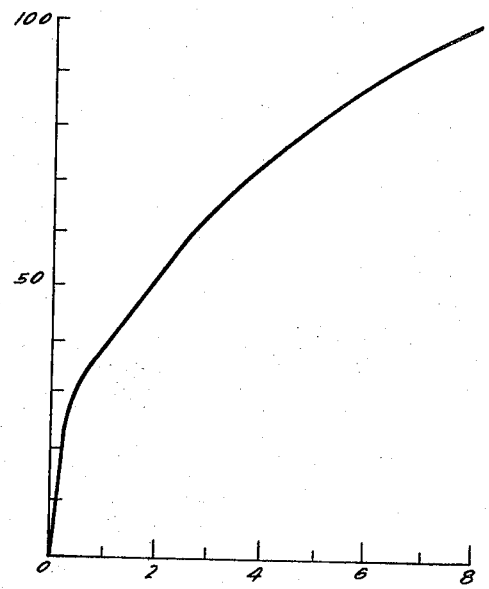

The course of dissolution of the medicament in the tablet of FIG. 7 is illustrated in FIG. 9, which shows the total amount of ephedrine hydrochloride released as a function of time. A strong initial dose is obtained, in that 30% of the ephedrine hydrochloride content was released in 30 minutes, whereas the residuum is released at a slower, substantially even rate, until all of the ephedrine hydrochloride has been released after about 8 hours.

Another method of preparing multi-layer tablets giving first a high initial medicament concentration and then an even release of the medicament, consists in making a multi-layer tablet manifesting a substantially rectilinear course in releasing its medicament content, and then covering this tablet with an overall coating which contains the medicament and dissolves or disintegrates rapidly after having been administered. Such an overall coating can be applied by compressing around the core a powder which contains the medicament. Such coating also may be applied by means of pan coating.

Figure 10:
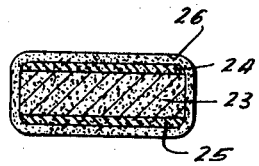

A tablet of this kind is illustrated in vertical, diametric cross-section in FIG. 10. A multilayer tablet consisting of a core 23 and retarding layers 24 and 25 is provided with an overall coating 26. The core 23 is the same as that described in connection with FIG. 5, with the difference that the sharp corners shown in FIG. 5 have been rounded. Thus, core 23 has been prepared by compressing a mixture of 19 milligrams of ephedrine hydrochloride powder having a grain size of about 100 microns, 11 milligrams of sodium chloride and 70 milligrams of polyvinyl chloride, the two latter substances having a grain size of about 500 microns. Each of retarding layers 24 and 25 provided over the opposite flat surfaces of core 23 weighs 50 milligrams and consists of a mixture of 20% of sodium chloride and 80% of polyvinyl chloride, both substances having a grain size of about 50 microns. The diameter of core 23 is 8 millimeters, and the total height of core 23 and layers 24 and 25 is 3.1 millimeters.

Figure 11:
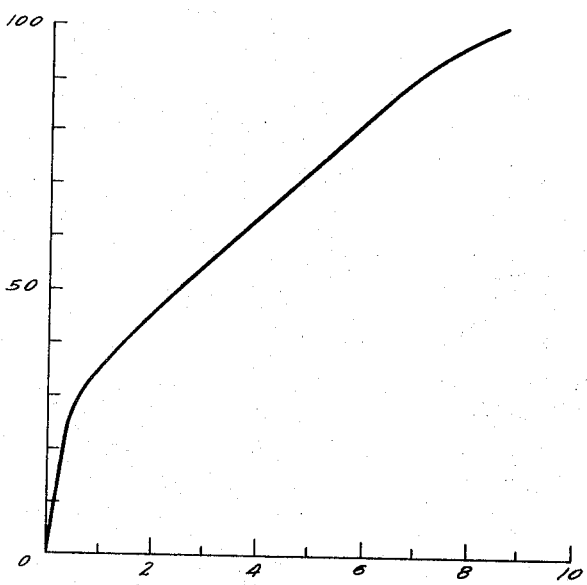

The multi-layer tablet 23–24–25 thus obtained is covered with overall coating 26 prepared by compressing a pulverulent mixture consisting of 4 milligrams of ephedrine hydrochloride, 10 milligrams of talcum, 66 milligrams of lactose, and 120 milligrams of potato starch. The finished tablet has a diameter of 10 millimeters and a height of 4.5 millimeters. After having been administered per os, the coating 26 immediately disintegrates, the initial dose of 6 milligrams of ephedrine hydrochloride being thereby released and accessible for absorption by the bloodstream. Then, the releasing of ephedrine hydrochloride from core 23–24–25 commences at a substantially even rate. The course of dissolution is illustrated in FIG. 11. The initial dose has been released from the coating over about 30 minutes, and the medicament of core 23 then is released at a substantially even rate over about 8 hours.

The multi-layer tablets described above have been made by first preparing the core, and then applying retarding layers on that core. A multi-layer tablet also may be prepared by compressing three pulverulent layers in one single compressing operation in a tablet machine which is arranged to provide three powder layers in a die and compressing said layers to form a tablet.

In principle, the insoluble material may consist of any powdered or granular non-toxic material (i.e. physiologically innocuous in the quantity to be used per tablet at the prescribed dosage regimen) substantially insoluble in digestive juice and of such consistency that it will form a coherent porous skeleton structure when compressed together with the soluble pulverulent material. We prefer to use thermoplastic synthetic materials such as polyvinyl chloride, polyethylene, acrylic resins such as polymethyl methacrylate, polystyrene, polyvinyl acetate, cellulose derivative materials such as cellulose acetate, and copolymers of said substance, e.g. a polyvinyl chloride-acetate co-polymer.

We have found it difficult mechanically to disintegrate polyethylene to form a suitable powder. Therefore, we dissolved polyethylene in hot benzene, evaporated the solution so as to form a semi-fluid mass, and pressed that mass through a sieve having a mesh size of, e.g. one-half to one millimeter. The particles thus obtained were then dried and formed a granular material which then was mixed with a soluble material and compressed to form tablets in the manner described.

When using polyethylene as insoluble material, we have found it suitable to use higher amounts of insoluble material than in the case when polyvinyl chloride is used as insoluble material. Thus, excellent tablets have been prepared containing 80 to 95% polyethylene. In tablets prepared containing smaller amounts of polyethylene, the soluble material will be released in a time which is too short for most practical purposes.

The same is true for acrylic resins, which should preferably be used in amounts from about 65 to about 95 percent.

Although we prefer to use a thermoplastic material, especially polyvinyl chloride, for the porous structure, a thermosetting material may also be used, e.g. a urea-formaldehyde or a melamine-formaldehyde resin. When using a thermosetting resin, it is of advantage to mix a resinous powder, the particles of which have not been fully hardened or cured, with the soluble material, to compress the mixture to a tablet, and to subject the tablet during the compression to a moderate heat treatment, which makes the resinous powder particle harder and thereby increases the strength of the resulting porous skeleton structure. When using a urea-formaldehyde or melamine-formaldehyde resin, it appears that the most convenient releasing time for the soluble material is obtained when the content of insoluble substance is from about 50 to about 95 percent.

A substance which gives excellent tablets, from the view of strength, is salol, i.e. phenyl salicylate. That substance, however, has a tendency to being saponified in alkaline digestive juices, and therefore we prefer to use the synthetic resins mentioned above.

The invention obviously is not confined to the use of particular types of medicinal substances. Besides the substances mentioned above, some other medicinal substances may be mentioned, as example only, other hypnotic drugs such as barbiturates and non-barbiturates, particularly of the short acting type, alkaloids such as atropine and papaverine, substances with hormonal effect, such as stilboestrol, and hypertension drugs, such as ganglion-blocking agents.

The above description has substantially dealt with tablets containing a medicinal substance, intended to be taken by the mouth. The scope of the invention, however, is not limited to the preparation and manufacture of such tablets, but also includes the manufacture of tablets for other purposes such as suppositories, vaginal suppositories and bacilliform tablets for human or veterinary purposes, and also other purposes in which it is desired to allow a soluble substance to be reacted upon by a solvent slowly and at a pre-determined rate.

It has been described above that the insoluble substance and the soluble substance, both in pulverulent form, shall be mixed together and compressed into tablets, said tablets having a prolonged action. It is possible further to increase the prolongation by first manufacturing a granulate in which the grains consist of an agglomerate of soluble and insoluble material. Such a granulate may be manufactured by grinding a tablet, prepared in accordance with this application, to form grains of a convenient grain size. Pursuant to a modification of the method according to the invention, granules may also be produced in another way, namely by pressing a moist thick paste through a sieve. As an example there is mentioned the production of granules consisting of polyvinyl chloride and amobarbital. The powdered polyvinyl chloride is thoroughly mixed with a suitable quantity of acetone which acts as a solvent on the surface of the polyvinyl chloride particles. The powdered amobarbital is then added by mixing, and the admixture squeezed through a sieve in the usual manner. The acetone is then allowed to evaporate from the resultant granules.

What we claim is:

1. A method of preparing medicinal tablets containing a solid material including therewith a medicament, and which solid material is leachable by a body fluid and is carried by non-toxic material substantially insoluble in said fluid and physiologically innocuous at the dosage regimen; which method comprises mixing a powder of said leachable material with a powder of said insoluble non-toxic material which latter upon compression of said mixture at a tablet-making pressure is capable of forming a firmly coherent, skeleton structure carrying the leachable material; and in so mixing said leachable and insoluble powders, taking the insoluble material in an amount sufficient to form said firmly coherent skeleton structure within the ratio by weight of from at least about 22.5 to about 95 parts thereof to from about 77.5 to about 5 parts of the leachable material whereby under such tablet-making pressure the insoluble material can form a firmly coherent, skeleton structure with the interstices between the insoluble material particles appearing as pore-like inter-connected canals and ducts with the leachable material compactly situated therein; subjecting the resulting mixture in suitable portions to tablet-making pressure and thereby compressing them to form tablets wherein the leachable material is compacted within the pore-like inter-connected canals and ducts constituting the interstices between the particles of the insoluble material as thus compressed into a firmly coherent, skeleton structure, and opening into the outer surface thereof, whereby when the body fluid contacts it, the leachable material is released at a controlled rate of leaching from said canals and ducts during such leaching and release of the leachable material.

2. A method of preparing medicinal tablets containing a solid material including therewith a medicament, and which solid material is leachable by a body fluid and is carried by plastic-resin material substantially insoluble in said fluid and physiologically innocuous at the dosage regimen; which method comprises mixing a powder of said leachable material with a powder of said insoluble plastic-resin material which latter upon compression of said mixture at a tablet-making pressure is capable of forming a firmly coherent, skeleton structure carrying the leachable material; and in so mixing said leachable and insoluble powders, taking them in a ratio by weight of from about 40 to about 95 parts of the insoluble material to from about 60 to about 5 parts of the leachable material whereby under such tablet-making pressure the insoluble material can form a firmly coherent, skeleton structure, with the interstices between the insoluble material particles appearing as pore-like inter-connected canals and ducts with the leachable material compactly situated therein; subjecting the resulting mixture in suitable portions to tablet-making pressure and thereby compressing them to form tablets wherein the leachable material is compacted within the pore-like inter-connected canals and ducts constituting the interstices between the particles of the insoluble material as thus compressed into a firmly coherent, skeleton structure, and opening into the outer surface thereof, whereby, when the body fluid contacts it, the leachable material is released at a controlled rate of leaching from said cannals and ducts during such leaching and release of the leachable material.

3. A method as claimed in claim 1, in which the leachable material consists of a medicinal substance.

4. A method as claimed in claim 1, in which the leachable material is prepared by mixing a finely divided, water-soluble therapeutically inert filler and a medicament substance.

5. A method as claimed in claim 4, in which the leachable material is prepared by mixing the inert filler and a liquid medicament in such proportions to yield discrete particles of liquid-medicament-carrying filler mixable with the insoluble material.

6. A method as claimed in claim 5, in which the leachable material is prepared by mixing the inert filler with a solution of a medicament substance in a compatible solvent.

7. A method as claimed in claim 1, in which the leachable material is a mixture of an easily soluble, powdered substance agglomerated with a slowly dissolving medicament substance in powder form.

8. A method as claimed in claim 1, comprising mixing the insoluble powder with a leachable powder containing the medicinal material as described therein, compressing said powder mixture to form a tablet as described therein and having two opposite substantially plane surfaces; mixing a said insoluble physiologically innocuous powder with a leachable therapeutically inert filler, thereby forming a second powder mixture applying said second powder mixture as a retarder layer on each of said two opposite surfaces of the tablet; and compressing the resulting aggregate to form a multi-layer tablet.

9. A method as claimed in claim 8, comprising covering the multi-layer tablet with a coating which contains a quantity of the medicament material admixed with innocuous ingredients that cause the coating to disintegrate rapidly after it has been wetted after having been administered per os.

10. A method as claimed in claim 1, comprising preparing a first powder mixture as described therein by mixing the insoluble powder with the leachable powder containing the medicinal material; preparing a second powder mixture by mixing a physiologically insoluble powder with a leachable therapeutically inert filler; providing an amount of said second powder in a die to form a bottom layer in said die; providing an amount of said first powder mixture in said die to form a second layer upon said bottom layer; providing an amount of said second powder mixture in said die, to form a top layer upon said second layer; and compressing said three powder layers in the die to form a multi-layer tablet.

11. A method as claimed in claim 1, in which the insoluble material is a synthetic resinous material.

12. A method as claimed in claim 11, wherein the resinous material is a thermosetting resin.

13. A method as claimed in claim 12, in which the thermosetting resin is a member of the class consisting of urea-formaldehyde and melamine-formaldehyde resins.

14. A method as claimed in claim 13, in which the thermosetting resin is admixed with the leachable material in a weight ratio of from about 50 to about 95 parts of the resin to from about 50 to about 5 parts of the other.

15. A method as claimed in claim 11, wherein the insoluble material is a thermoplastic resinous material.

16. A method as claimed in claim 15, wherein the resinous material is a thermoplastic resin selected from the class consisting of polyethylene, polyvinyl chloride, poly(methyl methacrylate), polystyrene, polyvinyl acetate, cellulose acetate, and a copolymer of monomers of the foregoing polymers.

17. A method as claimed in claim 16, in which polyethylene is admixed with the leachable material in a weight ratio of from about 80 to about 95 parts of the polyethylene to from about 20 to about 5 parts of the leachable material.

18. A method as claimed in claim 16, in which the polyvinyl chloride is admixed with the leachable material in a weight ratio of from about 65 to about 95 parts of the polyvinyl chloride to from about 35 to about 5 parts of the other.

19. A method as claimed in claim 16, in which the poly(methyl methacrylate) is admixed with the leachable material in a weight ratio of from about 65 to about 95 parts of the resin to from about 35 to about 5 parts of the other.

20. A method as claimed in claim 16, in which the polystyrene is admixed with the leachable material in a weight ratio of from about 65 to about 95 parts of the polystyrene to from about 35 to about 5 parts of the other.

21. A compressed pharmaceutical tablet comprising initially discrete finely divided particles of a material, said material including therewith a medicament and which material is leachable by a body fluid and uniformly distributed and compacted throughout pore-like interconnected canals and ducts of a firmly coherent skeleton structure composed of coherently compressed initially discrete, finely divided particles of a physiologically innocuous non-toxic material insoluble in said fluid and initially admixed with the original discrete particles of the leachable material, and which mixture was compressed under a tablet-making pressure to said compressed and rigid tablet unit wherein the interconnected canals and ducts are the resulting compressed interstices between the compressed particles of the insoluble material and open into the outer surfaces of said compressed unit, whereby, when a body fluid contacts said tablet, its leachable material is released at a relatively uniform rate by leaching from the canals and ducts while the skeleton structure remains substantially coherent until the leachable material is substantially completely released from it.

22. A tablet as claimed in claim 21, wherein the leachable material is a uniform admixture of the medicament and a water-soluble therapeutically inert filter.

23. A tablet as claimed in claim 21, wherein the opposed faces of the compressed unit of claim 21 are relatively plane surfaces and over each of said surfaces there is coherently attached thereto by pressure a compressed retarding-layer having the same type of physical constitution as the compressed unit, whereby the latter is sandwiched between those two retarding layers and all of them together form a unitarily compressed muti-layer tablet.

24. A tablet as claimed in claim 23, wherein the multi-layer tablet is completely enclosed within and contacted by an overall coating which throughout its thickness contains material soluble in an aqueous medium.

25. A tablet as claimed in claim 21, wherein the insoluble material is a member of the class consisting of a thermoplastic and a thermosetting synthetic resin.

26. A tablet as claimed in claim 21 in which the insoluble material is a thermoplastic synthetic resin member of the class consisting of polyethylene, polyvinyl chloride, poly(methyl methacrylate), polystyrene, polyvinyl acetate, cellulose acetate, and a copolymer of monomers of the foregoing polymers.

27. A tablet as claimed in claim 21, wherein the insoluble material is a thermosetting synthetic resin member of the class consisting of urea-foraldehyde resin, melamineformaldehyde resin, and compatible copolymers thereof.

28. A coated tablet comprising a core which is a compressed unit as described in claim 21, completely enclosed in and contacted by an overall coating of the same type of physical constitution as that of said core.

29. A tablet as claimed in claim 28, wherein the leachable constituent of the coating is a therapeutically inert material.

30. A method of preparing a coated pharmaceutical tablet having a smaller pharmaceutical tablet as a core enclosed in an enveloping coating layer, which method comprises preparing a powder mixture by mixing a powder of a solid material comprising a medicament, and which solid material is leachable by a body fluid, with a powder of a plastic-resin material substantially insoluble in said fluid and physiologically innocuous at the dosage regimen and which upon compression of said mixture at a tablet-making pressure is capable of forming a coherent skeleton structure carrying said leachable powder; and in so mixing said leachable and insoluble powders, taking the insoluble powder in an amount sufficient to form said firmly coherent skeleton structure and in a ratio by weight of from at least about 22.5 to about 95 parts thereof to from about 77.5 to about 5 parts of the leachable material, whereby under such tablet-making pressure the insoluble material can form a firmly coherent skeleton structure with the interstices between the insoluble material particles appearing as pore-like interconnected canals and ducts with the leachable material compactly situated therein; providing said powder mixture to serve as an enclosing coating layer around a medicinal tablet as a core; and compressing the resulting aggregate to form a composite tablet having such coating about that medicinal tablet as a core, and in which coating the leachable material is compacted within the pore-like inter-connected canals and ducts constituting the interstices between the particles of the insoluble material as thus compressed into a firmly coherent, skeleton structure, and opening into the outer surface thereof, whereby, when the body fluid contacts it, the leachable material is released at a controlled rate of leaching from said canals and ducts during such leaching and release of the leachable material.

31. The method of preparing a coated tablet as claimed in claim 30, wherein said smaller medicinal tablet used as the core is prepared by mixing a powder of a said leachable material with a powder of a said plastic-resin material in a ratio by weight as that recited in claim 30; subjecting said mixture in individual tablet-making portions to tablet-making pressure and thereby compressing them to form from each such portion a tablet having the leachable material compacted within the pore-like inter-connected canals and ducts constituting the interstices between the particles of the insoluble material as thus compressed into a firmly coherent, skeleton structure, and opening into the outer surface thereof, whereby, when the body fluid contacts it, the leachable material is released at a controlled rate of leaching from said canals and ducts during such leaching and release of the leachable material; and using said resulting tablet as the core to be enclosed in the enclosing coating.

32. A method as claimed in claim 31, in which said leachable powder for the coating contains a quantity of a medicament substance.

33. A modification of the method as claimed in claim 31, in which the leachable powder for the coating consists of a therapeutically inert filler substance.

34. A composite pharmaceutical tablet having a smaller tablet as a core enclosed within a coating comprising initially discrete finely divided particles of a material leachable by a body fluid and including a medicament, said material being uniformly distributed and compacted throughout pore-like inter-connected canals and ducts of a firmly coherent skeleton structure composed of coherently compressed initially discrete, finely divided particles of a physiologically innocuous plastic-resin material insoluble in said fluid and initially admixed with the original discrete particles of the leachable material, and which mixture was compressed about said core and under a tablet-making pressure into said composite unit having said core enclosed within said coating wherein the inter-connected canals and ducts are the resulting compressed interstices between the compressed particles of the insoluble material and open into the outer surfaces of said compressed composite unit, whereby, when said fluid contacts said tablet, its leachable material is released at a relatively uniform rate by leaching from the canals and ducts while the skeleton structure remains substantially coherent until the leachable material is substantially completely released from it.

35. A medicinal tablet for oral administration comprising a continuum of an insoluble, non-toxic matrix in skeleton form, the insolubility being in digestive juice, said matrix having in the interstices thereof interconnected canals and ducts, the canals and ducts being filled with a drug and leachable filler, the canals and ducts being continuous to the outer surfaces of the tablet so that a portion of said drug and filler extends to and is exposed on an outer surface of said tablet, the matrix resisting disintegration in digestive juices and retaining substantially its original tablet form during the entire-leaching out period, said tablet requiring a period of at least about 8 hours for the drug to be substantially completely leached therefrom by the action of said digestive juice.

References Cited by the Examiner

UNITED STATES PATENTS

| | | | |
|---|---|---|---|
| Re. 24,090 | 11/1955 | Diamond | 167—82.9 |
| 2,155,658 | 4/1939 | Herrmann | 167—82.9 |
| 2,413,419 | 12/1946 | Saunders | 167—82.9 |
| 2,478,182 | 8/1949 | Consolazio | 167—82.9 |
| 2,566,200 | 8/1951 | Hickey | 167—82.5 |
| 2,656,298 | 10/1953 | Loewe | 167—82.9 |
| 2,702,264 | 2/1955 | Klaui | 167—82.5 |
| 2,736,682 | 2/1956 | Hermelin | 167—82.9 |
| 2,757,124 | 7/1956 | Wolff | 167—82 |
| 2,793,979 | 5/1957 | Svedres | 167—82.9 |
| 2,809,917 | 10/1957 | Hermelin | 167—82.9 |

FOREIGN PATENTS

| | | |
|---|---|---|
| 109,438 | 1/1940 | Australia. |
| 630,439 | 10/1949 | Great Britain. |
| 742,544 | 12/1955 | Great Britain. |
| 760,403 | 10/1956 | Great Britain. |

OTHER REFERENCES

Celacets, Suter Chem. Co., Altoona, Pa.; 1949, pp. 1–4.

J.A.P.A., Pract. Pharm. ed., vol. 15, No. 10; October 1954, pp. 591–592.

Mitchell, Coating Tablets by Compression, Mfg. Chemist, March 1955, pp. 107–111.

Silver et al., Manufacture of Compressed Tablets, F. J. Stokes Machine Co.; Philadelphia, Pa.; 1944; pp. 5 and 31.

LEWIS GOTTS, *Primary Examiner.*

WILLIAM B. KNIGHT, MILTON O. WOLK, *Examiners.*

SHEP K. ROSE, W. W. RITT, E. A. SHALLOWAY,
*Assistant Examiners.*

UNITED STATES PATENT OFFICE
CERTIFICATE OF CORRECTION

Patent No. 3,317,394                                    May 2, 1967

Lars-Einar Fryklof et al.

It is hereby certified that error appears in the above numbered patent requiring correction and that the said Letters Patent should read as corrected below.

Column 10, line 37, for "50" read -- 500 --.

Signed and sealed this 1st day of October 1968.

(SEAL)
Attest:

Edward M. Fletcher, Jr.                               EDWARD J. BRENNER
Attesting Officer                                          Commissioner of Patents